May 13, 1930. G. J. MAX 1,758,165
OUTLET LEG AND VALVE FOR TANK CARS
Filed Sept. 14, 1928
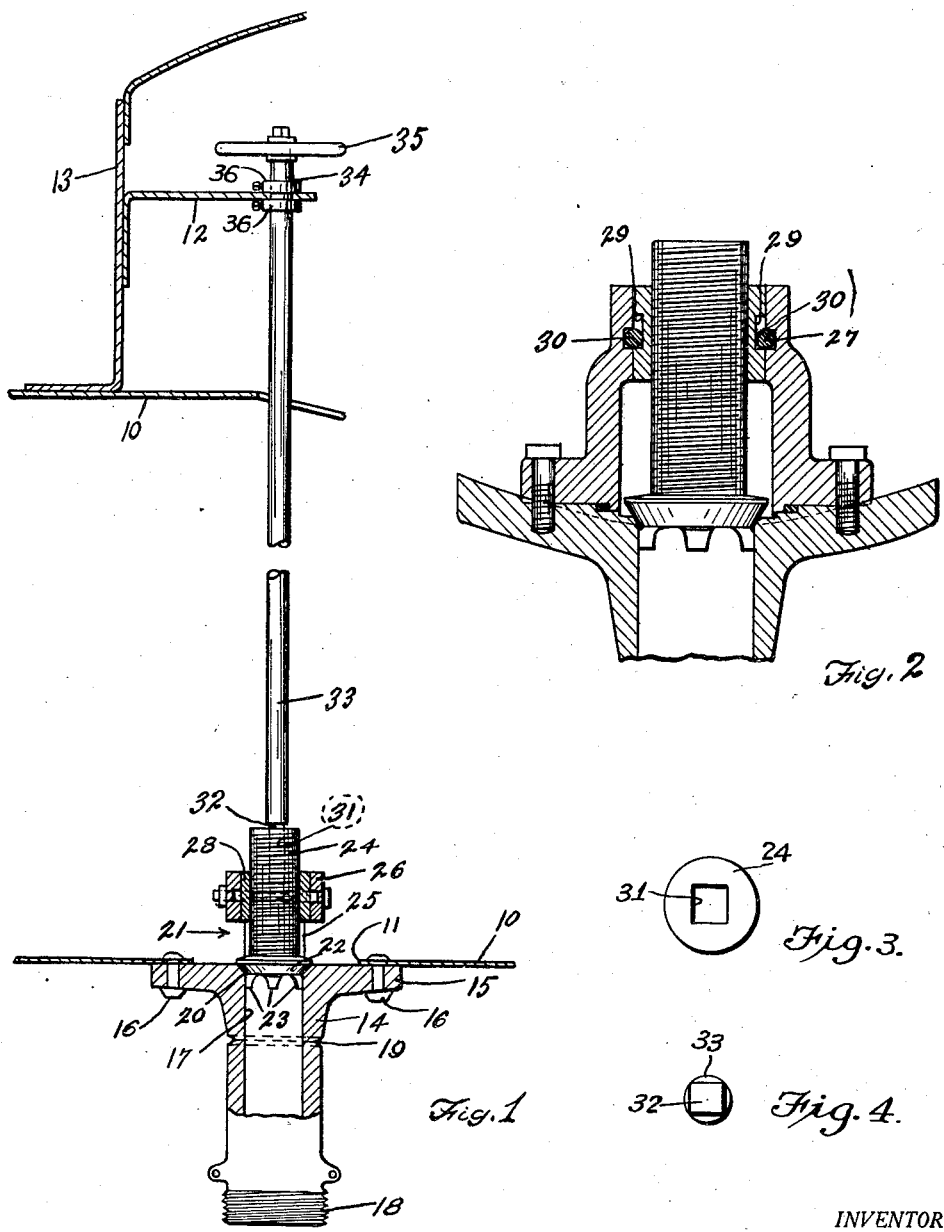
INVENTOR.
George J. Max
BY
Fay, Oberlin & Fay
ATTORNEYS.

Patented May 13, 1930

1,758,165

UNITED STATES PATENT OFFICE

GEORGE J. MAX, OF WARREN, OHIO, ASSIGNOR TO TRUMBULL MANUFACTURING COMPANY, OF WARREN, OHIO, A CORPORATION OF OHIO

OUTLET LEG AND VALVE FOR TANK CARS

Application filed September 14, 1928. Serial No. 305,887.

The present invention relates, as indicated, to valves, and more particularly to a valve and outlet leg for tank cars. The primary object of the invention is to provide an improved valve of the type indicated, so arranged as to be self-cleansing and to be easily ground on its seat without removing the installation from the tank. Further objects of the invention will appear as the description proceeds. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a sectional view of a valve according to the present invention installed in a tank; Fig. 2 is a sectional view of the valve and seat members taken substantially at right angles to the view of Fig. 1; Fig. 3 is a top plan view of the upper end of the valve member; and Fig. 4 is a bottom plan view of the lower end of the actuating stem.

Referring more particularly to the drawings, the reference numeral 10 indicates a tank of the type usually to be found in tank cars, said tank being provided with an aperture 11 in its bottom and with a bracket 12 secured in an exterior housing 13. The aperture 11 is adapted to be closed by the valve of the present invention which comprises a tubular member 14 provided with an annular flange 15 by which the member is secured to the tank 10 through the medium of rivets or other fastening means 16 so that the bore 17 of said member registers with the aperture 11. The lower free end of said member 14 is preferably screw threaded as at 18 for connection to a pipe or hose member in discharging the contained fluid from the tank, and at a point adjacent the upper end of said member, the same is grooved as at 19. The groove 19 is provided as a safe-guard in case the member 14 comes into contact with some obstruction on the track while the car is moving. In such event, the lower end of the member will break off at the point where the same is weakened by the groove 19, rather than being wrenched off of the tank bodily to permit the loss of fluid from the tank.

The member 14 is formed at its upper or inner end with a beveled seat 20, and a valve head 21 is formed at its one end with a face 22 for cooperation with said seat 20. Projections 23 extend outwardly from said face 22 to guide the valve in its seating movement.

A threaded projection 24 extends from the opposite side of said valve head, and a cage 25 is secured to, or made integral with, the member 14, said cage extending inwardly from said member. Said cage 25 terminates in an annular collar 26 which is formed with an interior annular groove 27. An internally threaded bushing 28 is threaded on said projection 24 and is loosely mounted in said collar 26. As is clearly shown in Fig. 2, said bushing 28 is formed with a pair of parallel transverse grooves 29 in its peripheral surface, and said collar 26 is formed to receive a pair of bolts 30. As is clearly shown in Fig. 2, said bolts, when in position, enter the groove 27 and the two grooves 29 in the bushing 28 to prevent rotation of said bushing.

It will be seen that a polygonal socket 31 is formed in the upper or inner end of the projection 24, and that the lower or free end 32 of a valve stem 33 is correspondingly shaped and is adapted to enter said socket. The upper end 34 of said stem 33 is journalled for rotation, but against reciprocation, in said bracket 12, (for instance, by means of a pair of set collars 36), and a hand wheel 35 is preferably secured to the upper end of said stem.

Referring to Fig. 2, it will be seen that, while the groove 27 has an axial height substantially equal to the diameter of the bolts 30, the grooves 29 are of substantially greater axial height.

In the particular embodiment disclosed herein, the projection 24 is formed with four threads in each inch of length, and in said embodiment the grooves 29 are three-fourths of an inch in axial height, while the bolts 30 are one-half inch in diameter. Of course, it is to be understood that these dimensions may be varied without departing from the present invention so long as such variations do not take the structure out of the terms of the claims forming a part hereof.

In operation, supposing the valve to be in open position, if the hand wheel 35 is turned in a clockwise direction, such rotation will be transmitted through the polygonal end 32 of the stem 33 to the head 21. The bolts 30 being in place, such rotation of the head 21 will, through the medium of the threads on the extension 24 and on the bushing 28, cause downward movement of the head 21 until the face 22 comes into contact with the valve seat 20. As soon as such contact is made, downward movement of the head substantially stops, and continued rotation of the hand wheel 35 will cause the bushing 28 to move upwardly in the cage 25, until the lower edges of the grooves 29 come into contact with the bolts 30. It will be seen that, with the dimensions above suggested, the bushing 28 is permitted to move a quarter of an inch before it is stopped by the bolts 30, and therefore the head 21 is permitted to turn through one full revolution after it comes into contact with the seat 20 and before it is locked. Correspondingly, with the parts in the positions illustrated in the drawings, if the hand wheel 35 be rotated in a counter-clockwise direction, the valve head 21 will be rotated through one revolution in contact with the seat 20, while the bushing 28 moves downwardly until the upper edges of the grooves 29 contact with the bolts 30, after which the head will be raised off the seat to permit liquid to flow therepast.

In case it is desired to regrind the valve and seat, this may be accomplished merely by removing the bolts 30 from the collar 26 which will release the bushing 28 for free rotation. Thereafter, the hand wheel 35 may be rotated without moving the head 21 either toward or away from its seat, and thus, the face 22 may be rotated as long as may be desired in contact with the seat 20.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A valve comprising a seat member, a cage carried by said seat member and terminating in a collar, an internally threaded bushing loosely mounted in said collar, said bushing being formed with a transverse groove in its peripheral surface, means carried by said collar and cooperable with said groove to prevent rotation of said bushing, a valve head having an externally threaded projection threaded in said bushing, and means for rotating said head.

2. A valve comprising a seat member, a cage carried by said seat member and terminating in a collar, an internally threaded bushing loosely mounted in said collar, said bushing being formed with a transverse groove in its peripheral surface, removable means carried by said collar and adapted, when in place, to cooperate with said groove to prevent rotation of said bushing, a valve head having an externally threaded projection threaded in said bushing, and means for rotating said head.

3. A valve comprising a seat member, a cage carried by said seat member and terminating in a collar, an internally threaded bushing loosely mounted in said collar, said bushing being formed with a transverse groove in its peripheral surface, means carried by said collar and cooperable with said groove to prevent rotation of said bushing but permitting limited axial reciprocation thereof, a valve head having an externally threaded projection threaded in said bushing, and means for rotating said head.

4. A valve comprising a seat member, a cage carried by said seat member and terminating in a collar, an internally threaded bushing loosely mounted in said collar, said bushing being formed with a transverse groove in its peripheral surface, an element carried by said collar and entering said groove, said element having an axial height less than the axial height of said groove, a valve head having an externally threaded projection threaded in said bushing, and means for rotating said head.

5. A valve comprising a seat member, a cage carried by said seat member and terminating in a collar, an internally threaded bushing loosely mounted in said collar, said bushing being formed with parallel transverse grooves in its peripheral surface, a pair of bolts secured in said collar and adapted to enter said respective grooves, each of said bolts having a diameter less than the axial height of its respective groove, a valve head having an externally threaded projection threaded in said bushing, and means for rotating said head.

6. In combination with a tank having an aperture therein, a valve comprising a tubular member secured to said tank in registry with said aperture, a valve seat formed at the inner end of said member, a valve head having a face adapted to cooperate with said seat, an externally threaded projection on the side of said head opposite said face, means for rotating said head, a cage carried by said member and including a collar, an internally threaded bushing having transverse parallel grooves in its peripheral surface, said bushing being loosely mounted in said collar, and a pair of bolts adapted to be removably secured in said collar and, when so secured, entering said respective grooves, the diameter of said bolts being less than the axial height of said grooves.

7. In combination with a tank having an aperture in its bottom wall, a valve adapted to close said aperture comprising a tubular member secured to said tank in registry with said aperture and formed at its inner end with a valve seat, a cage secured to said member and extending inwardly therefrom, said cage terminating in a collar, a valve head formed at its one end for cooperation with said seat, a threaded projection on said head opposite said face, said projection being formed with a polygonal socket in its free end, an internally threaded bushing threaded on said projection and loosely mounted in said collar, said bushing being formed with parallel grooves in its peripheral surface, a pair of bolts removably secured in said collar and entering said grooves, respectively, the diameter of said bolts being less than the axial height of said grooves, a bracket without said tank, a valve stem having its upper end journalled in said bracket for rotation but against reciprocation, and a polygonal projection on the lower end of said stem entering said socket.

Signed by me this 11th day of September, 1928.

GEORGE J. MAX.